Nov. 30, 1926. 1,608,976
F. C. COLMER
CLAMP FOR SLICING MACHINES
Filed Feb. 17, 1926
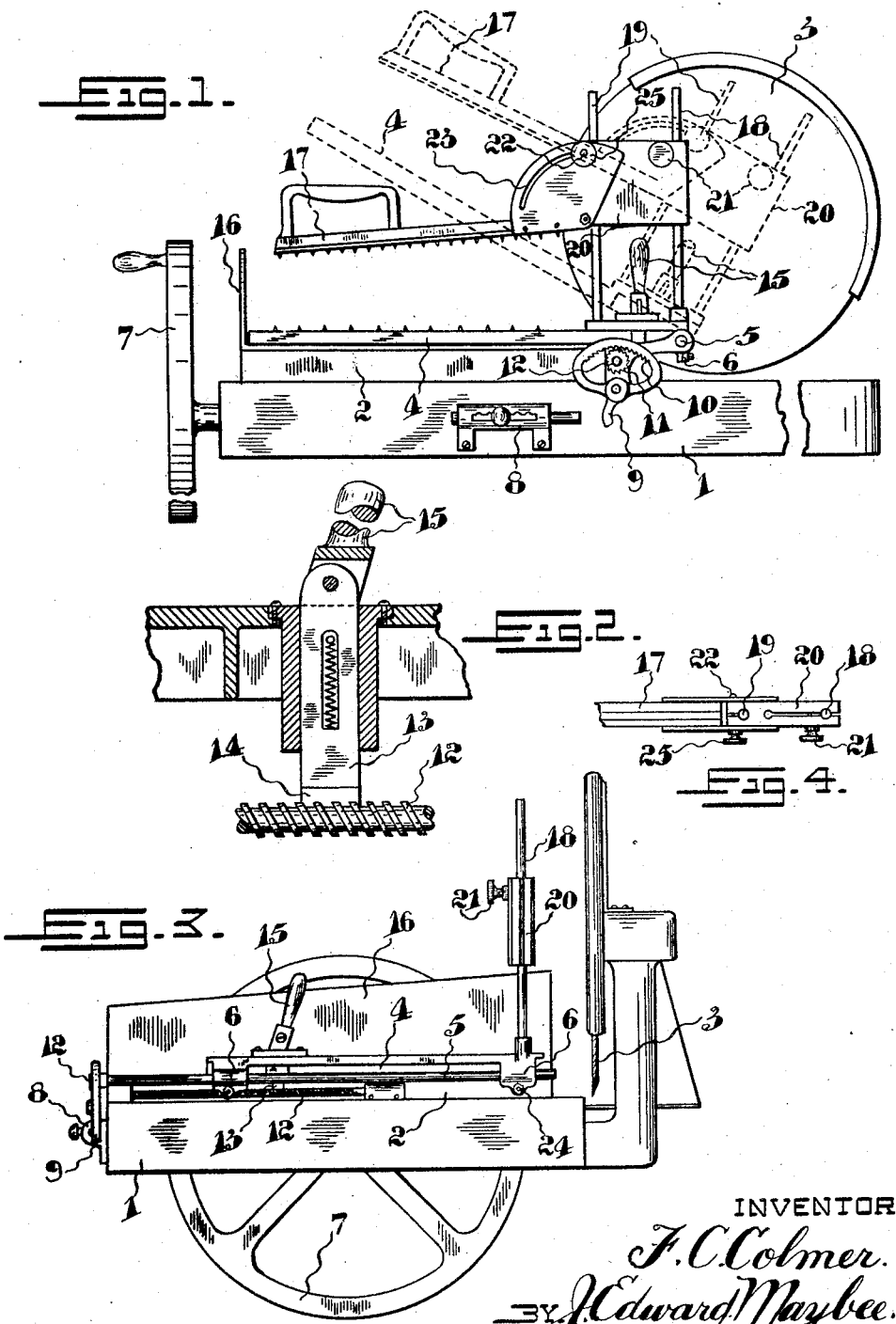

Patented Nov. 30, 1926.

1,608,976

UNITED STATES PATENT OFFICE.

FREDERICK C. COLMER, OF BOWMANVILLE, ONTARIO, CANADA.

CLAMP FOR SLICING MACHINES.

Application filed February 17, 1926. Serial No. 88,826.

This invention relates to slicing machines such as used for slicing cooked meats and the like. The object in the present invention is to simplify the construction of the machine and at the same time to overcome certain disadvantages of the machines as heretofore constructed. These machines usually comprise a frame on which reciprocates a carriage, while over the carriage is slidably mounted a meat carrier.

In use a certain amount of material accumulates between the meat carrier and carriage, and owing to the present construction it is difficult to clean between these two parts, it being necessary to slide the carrier off at one end of the carriage. One important feature of my present invention, is to arrange the machine whereby the cleaning out between these two parts is greatly facilitated.

A further objection to the present machine is that the meat gives under the pressure of the knife so that the slices are not of equal thickness throughout, and what are known as "tag ends" are eventually formed. To overcome this the carriage is provided with a grooved plate on which the projecting end of the meat rests, but under the action of the knife the meat is often forced into the grooves and rough edges are thus formed on the slice. Some recent machines have been provided with a support for the meat at the side of the grooved plate, but owing to the method of mounting the clamp for the meat, these devices are more or less difficult to apply to the machines.

I overcome these disadvantages by mounting the meat carrier on a shaft at one side of the machine so that the carrier may not only slide on the shaft, but also swing thereon in the manner of a hinge leaf, the other side of the carrier simply resting on the top of the carriage, and by supporting the meat clamp entirely from one side of the meat carrier, thus leaving the other side of the carrier without obstruction, and enabling me to provide a firm support for the side of the meat.

My improved construction is hereinafter more specifically described and illustrated in the accompanying drawings in which Fig. 1 is a rear view of my improved machine, the meat carrier being shown in normal position in full lines and in raised position for cleaning in dotted lines;

Fig. 2 is a sectional detail illustrating the feed mechanism for the meat carrier;

Fig. 3 a side elevation of my machine; and

Fig. 4 a detail in plan of the meat clamp.

In the drawings like numerals of reference indicate corresponding parts in the different figures.

My apparatus, as usual comprises the three main parts the base 1, the carriage 2 mounted to reciprocate on the base past the knife 3, and the meat carrier 4 which lies over and is actuated relative to the carriage to feed the meat forward after the cutting off of each slice.

At one side of the carriage is mounted a shaft 5, and the carrier 4 is provided with bearings 6 to receive the shaft 5. Each bearing is preferably split as indicated and provided with screws 24 by means of which the bearings may be tightened in the event of any material amount of wear taking place either in the shaft or in the bearing itself. The shaft 5, being circular in cross section, it will be seen that the meat carrier may not only move longitudinally of the shaft but may be swung thereon in the manner of a hinge leaf as indicated in dotted lines in Fig. 1.

Normally, however, the carrier will lie flat on the surface of the carriage, and will only be moved to the position shown in dotted lines when it is desired to clean the under surface of the carrier or the upper surface of the carriage.

The carriage will be actuated back and forth past the knife by means of the usual hand wheel 7 and other parts commonly employed, but which form no part of the present invention and therefore need not be described in detail.

As the carriage is reciprocated, the meat carrier will be fed forward step by step, an adjustable stop device 8 being provided on the base, with which is adapted to engage a lever 9 pivoted on the carriage. This lever has formed thereon a segmental gear 10, which gear meshes with a pinion 11 on a worm 12 journalled in suitable bearings on the carriage.

Carried by a member 13 on the carrier is a half nut 14 which is adapted to mesh with the worm 12, so that as the worm is rotated the carrier is fed forward. To throw the half nut out of action so that the carrier may be moved backward, the member 13 is vertically movable on the carrier, its upper end having a handle 15 pivoted thereon, the handle having a cam formed on its lower end which engages the carrier and by means of which the member 13 may be raised. This handle also provides a convenient means for moving the carrier backwards.

The upper surface of the carriage will preferably be formed as a flat plate having integral therewith at the side remote from the shaft 5 an upwardly directed flange 16, although this flange may, if desired be formed as a separate part and secured in position by means of any suitable supports.

This flange 16 forms an abutment against which the side of the meat being cut may lie so that the meat cannot be pushed away under the pressure of the knife, thus avoiding the thinning out of the slice towards one side and the consequent formation of what is known as a "tag end" on the piece of meat remaining to be cut.

The plate forming the upper surface of the carriage may be grooved as has heretofore been commonly done, but as the flange 16 will sufficiently hold the meat in position, this grooving may be omitted, and in fact it is preferable that it be omitted to prevent the formation of a ragged lower edge on the slice as hereinbefore referred to.

The meat clamp has usually been supported by means of two posts, one at each side of the meat carrier, and as the flange 16 to be of any particular value, must of necessity be within the posts, special arrangements of the carrier and flange have had to be provided. To simplify the construction so that the carrier and flange may co-operate with one another to the best advantage, I support the meat clamp 17 solely from the side of the carrier closest to the shaft 5.

While various arrangements for supporting the meat clamp are possible, I preferably provide two posts 18 and 19 spaced from one another in a direction longitudinally of the clamp. The clamp proper, is preferably pivotally connected with a clamping sleeve 20 vertically slidable on the posts. At least that end of the clamping sleeve 20 adjacent the post 18 is split, so that by turning the screw 21 the parts may be drawn together to lock the sleeve on the post in position as adjusted. The pivoted end of the clamp is forked to receive the clamping sleeve 20. A pin 22 passes through a hole in the clamping sleeve and through slots 23 in the forked end of the clamp. This pin is threaded so that by tightening up the nut 25 thereon, the clamp will be frictionally held in position as adjusted.

As there will likely be a small amount of play between the clamping sleeve and post 19, I may if desired split the upper part of the clamping sleeve entirely through from end to end, and thus the tightening of the nut 25 on the pin 22 will not only hold the clamp in position as adjusted, but will also hold the clamping sleeve in position relative to the post 19.

The apparatus is used as follows. The meat to be sliced will be placed so that part of it will rest on the carrier 4 and so that it lies tightly against the flange 16. The flange 16, it will be seen, forms a guide which assists in positioning the end of the meat relative to the knife so that the possibilty of having a number of uneven slices at the commencement of the slicing operation is reduced to a minimum.

The screw 21 is then unloosened and the sleeve 20 and clamp moved downwardly until the clamp is in engagement with the meat when the screw is again tightened up. Pressure is then applied to the clamp 17 to swing it downwardly and the nut 24 is then tightened up on the pin 22 to hold the clamp in position. The machine is then operated by turning the hand wheel 7 to feed and slice the meat. The meat carrier may be set at any desired position to commence operations by rocking the handle 15 to raise the member 13 which carries the half nut 14 to disengage the latter from the worm, and the carrier may then be moved backward or forward, or the carrier may be swung on the shaft 5 if it is desired to clean out below the carrier.

It will be evident, however, that many minor changes in the details of construction may be made without departing from the spirit of my invention.

What I claim is:

1. In a slicing machine for cooked meats and the like, the combination of a circular rotary knife; a carriage adapted to be moved back and forth transversely of the axis of the knife; a meat carrier slidable above said carriage to and from the knife, said carrier being hingedly connected with the carriage; and an upwardly directed flange on said carriage, said flange forming a side for the meat carrier.

2. In a slicing machine for cooked meats and the like, the combination of a circular rotary knife; a carriage adapted to be moved back and forth transversely of the axis of the knife; a meat carrier slidable above said carriage to and from the knife, said carrier being hingedly connected with the carriage; and meat clamping means supported solely from one side of the meat carrier.

3. In a slicing machine for cooked meats and the like, the combination of a circular rotary knife; a carriage adapted to be moved back and forth transversely of the axis of the knife; a meat carrier slidable above said carriage to and from the knife, said carrier being hingedly connected with the carriage; meat clamping means supported solely from one side of the meat carrier; and a side for the other side of said carrier, said side being mounted on the carriage.

4. In a slicing machine for cooked meats and the like, the combination of a circular rotary knife; a carriage adapted to be moved back and forth transversely of the axis of the knife; a meat carrier slidable above said carriage to and from the knife; supporting means at one side of said carrier; and a meat clamping device carried solely by said supporting means and vertically movable thereon.

5. In a slicing machine for cooked meats and the like, the combination of a circular rotary knife; a carriage adapted to be moved back and forth transversely of the axis of the knife; a meat carrier slidable above said carriage to and from the knife; a pair of posts at one side of said carrier; said posts being spaced apart in a direction transversely of the axis of the knife and a meat clamping device carried solely by said pair of posts and vertically movable thereon.

6. In a slicing machine for cooked meats and the like, the combination of a circular rotary knife; a carriage adapted to be moved back and forth transversely of the axis of the knife; a meat carrier slidable above said carriage to and from the knife; a post at one side of said carrier, a clamping sleeve slidable on said post; a meat clamping device pivotally connected with said sleeve; and means for locking said meat clamping device in position as adjusted.

7. In a slicing machine for cooked meats and the like, the combination of a circular rotary knife; a carriage adapted to be moved back and forth transversely of the axis of the knife; a meat carrier slidable above said carriage to and from the knife; a post at one side of said carrier, a clamping sleeve slidable on said posts; a meat clamping device pivotally connected with said sleeve; means for locking said meat clamping device in position as adjusted comprising a pin and slot connection between said sleeve and meat clamping device; and a clamping nut threaded on said pin.

8. In a slicing machine for cooked meats and the like, the combination of a circular rotary knife, a meat carrier, said knife and carrier being movable relative to one another transversely of the axis of the knife, and said carrier being slidable to and from the knife; supporting means at one side of said carrier; and a meat clamping device carried solely by said supporting means and movable vertically thereon.

Signed at Bowmanville, Ontario, this 11th day of February 1926.

FREDERICK C. COLMER.